UNITED STATES PATENT OFFICE.

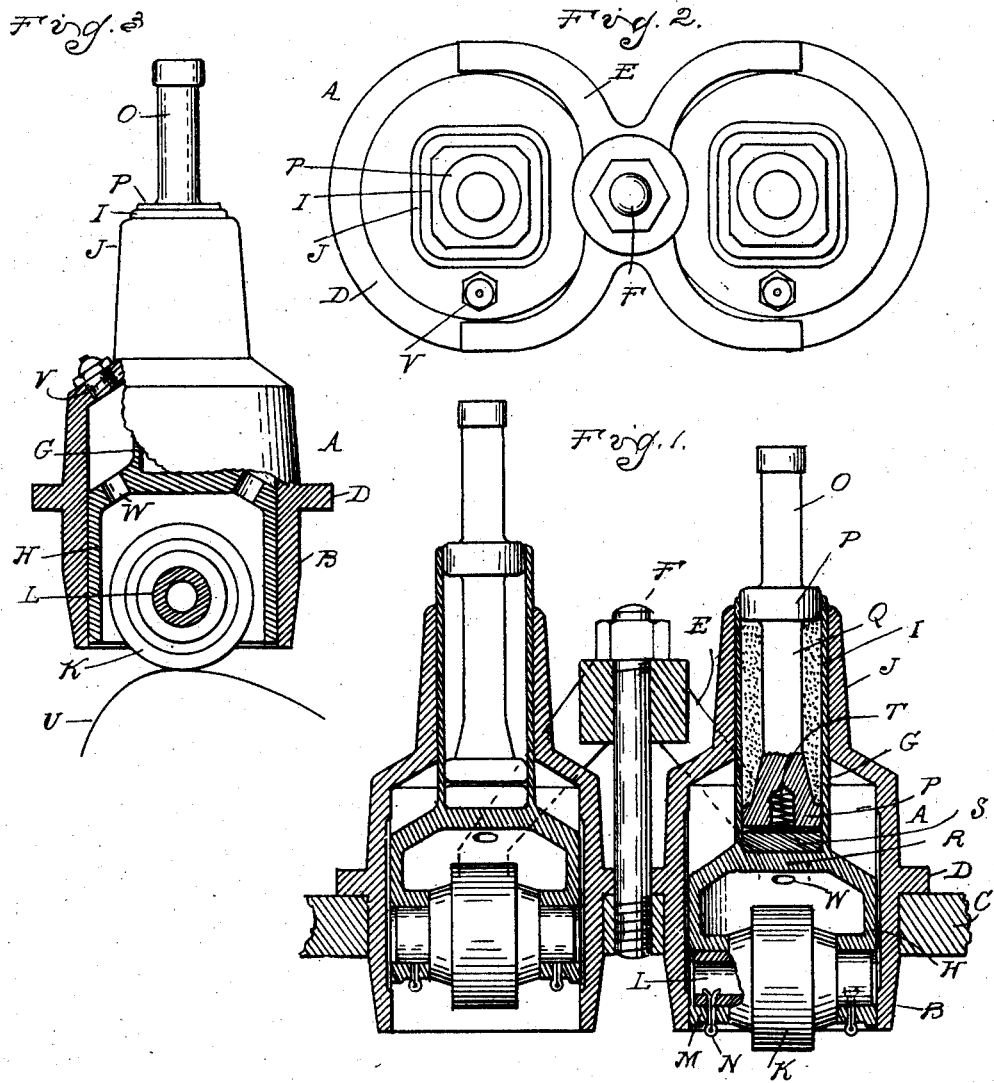

GEORGE W. DUNHAM, OF LANSING, MICHIGAN, ASSIGNOR TO OLDS MOTOR WORKS, OF LANSING, MICHIGAN, A CORPORATION OF MICHIGAN.

VALVE-ACTUATING ROD.

970,999.     Specification of Letters Patent.     Patented Sept. 20, 1910.

Application filed March 19, 1907. Serial No. 363,217.

*To all whom it may concern:*

Be it known that I, GEORGE W. DUNHAM, a citizen of the United States of America, residing at Lansing, in the county of Ingham and State of Michigan, have invented certain new and useful Improvements in Valve-Actuating Rods, of which the following is a specification, reference being had therein to the accompanying drawings.

The invention relates to valve actuating mechanism, and consists in certain novel features of construction of a valve actuating push-rod, as hereinafter set forth.

In the drawings, Figure 1 is a longitudinal section; Fig. 2 is a top plan view; Fig. 3 is a sectional elevation looking at right angles to Fig. 1.

In the construction of valve actuating mechanism of the push-rod type, it is necessary, in order to insure the seating of the valve under all conditions, to provide a clearance, or lost motion, sufficient to compensate for any expansion of parts. On the other hand, it is equally desirable to avoid the pounding due to the impact of one part upon another when the mechanism is driven at high speed.

It is one of the objects of the present invention to avoid pounding, while providing sufficient clearance for the rod.

It is a further object to provide a ready means of adjustment whereby an unnecessary degree of lost motion is avoided, and, further, to improve and simplify the construction and arrangement of parts.

A is the casing, or bearing, for the push-rod, which is preferably provided with an enlarged hollow cylindrical portion B extending through an aperture in the crank casing C, and having a flange bearing D for forming a seat on said crank casing. E is a bifurcated clamping member bearing upon the flange D, and secured to the casing C, as by means of the clamping bolt F.

Within the casing A is slidably secured a member G, which forms the lower end of the push-rod. This member has an enlarged cylindrical portion H fitting within the cylindrical portion B of the casing A, and a square or polygonal portion I, which fits within a correspondingly shaped upper portion J of the casing A. The portion H is hollow, and contains a roller K, journaled in a transversely extending pin L, secured in bearings M, as by means of pins N. This roller K is almost entirely within the hollow member H, and is capable of moving with the latter to be completely withdrawn into the hollow casing B. Thus, a roll of relatively large diameter may be employed. The upper portion or stem I of the member G is also hollow, and telescopically engages the lower end of the upper rod member O. This member O is preferably formed with separated annular bearings P, closely fitting within the member I, and between these bearings the rod O is cut away, or reduced in diameter, as at Q, the space being packed with a plastic filler, such as grease. At the lower end of the rod O, the socket member I is provided with a bearing R, which is, however, spaced from the end of the rod. This space is almost completely filled by a block, or filler member S, but sufficient clearance is provided to afford the necessary lost motion.

T is a coiled spring, fitting within a recess in the lower end of the rod O, and bearing against the block S to hold the latter against the bearing R, and also to hold the roll K in contact with its actuating cam U (see Fig. 3). V is a capped oiling aperture in the casing A leading into the chamber within the cylindrical portion B, and W are oil apertures through the portion H of the member G for supplying lubricant to the cam bearing roll K.

With the construction as above described, the parts may be readily assembled, and the proper degree of clearance between the members O and G adjusted by selecting from a plurality of filler blocks S of different thicknesses one which is of the proper size. As has been stated, the space Q is packed with grease, or plastic lubricant, which also fills the clearance space between the block S and lower end of the rod O. Thus, the impact is cushioned by the filling of grease, and the noise is correspondingly deadened.

By forming the member G with the hollow cylindrical portion H and the polygonal portion I, the roll may be journaled within said cylindrical portion without cutting away or slotting the walls thereof, and is held from turning by the polygonal portion. This arrangement also provides a bearing for the stem at the side of the roll, which takes care of the side thrust occasioned by the engagement of the cam with the roll.

What I claim as my invention is:

1. A valve actuating rod comprising two members telescopically engaging each other and provided with separated coöperating bearings or abutments, and a rigid exchangeable filler block between said abutments or bearings.

2. A valve actuating rod comprising two members telescopically engaging each other and having coöperating shoulders or abutments, and a rigid filler block between said shoulders or abutments.

3. A valve actuating rod comprising two members telescopically engaging each other, having coöperating shoulders or abutments, and a plastic filler between said coöperating shoulders or abutments.

4. A valve actuating rod comprising two members telescopically engaging each other and having coöperating shoulders or abutments, the inner member being cut away to form a chamber for a plastic material, said plastic material being drawn from said chamber upon the separation of said shoulders or abutments to fill the space between the same.

5. A valve actuating rod comprising a member provided with a hollow cylindrical portion and a polygonal stem of reduced diameter, having a cylindrical recess therein, a cam bearing roll journaled within a said hollow cylindrical portion, a casing in which said member is slidably secured, having portions respectively fitting said hollow cylindrical portion and stem, and a member fitting the socket in said stem and having an abutment therein.

6. A valve actuating rod comprising a member having a hollow cylindrical portion and a hollow polygonal stem of reduced diameter, a cam bearing journaled within said hollow cylindrical portion, a casing for said stem having a portion fitting the same and having an enlargement incasing said hollow cylindrical portion and forming a bearing therefor, said casing having a sliding engagement with said stem and cylindrical portion, and a member fitting the hollow polygonal stem and having an abutment therein.

7. A valve actuating rod comprising a member having a hollow cylindrical portion and a hollow polygonal stem of reduced diameter, a cam bearing roll journaled within said cylindrical portion, a casing for said stem having a portion fitting the same, and having an enlargement incasing said cylindrical portion and forming a bearing for the lower end thereof, said casing having a sliding engagement with said stem and cylindrical portion, and a member fitting the hollow polygonal stem and having a lost motion therein.

8. A valve actuating rod comprising two members telescopically engaging each other and having coöperating shoulders or abutments, and a chamber for a plastic material formed around the inner member, said plastic material filling the space between said coöperating shoulders or abutments.

9. A valve actuating rod comprising a member having a hollow cylindrical portion and a polygonal stem of reduced diameter, a cam bearing roll journaled within said hollow cylindrical portion, and a casing in which said member is slidably secured having portions respectively fitting said hollow cylindrical portion and said polygonal stem, the sides of said hollow cylindrical portion in a plane opposite the plane of rotation of said bearing roller having substantially their entire surface in constant contact with its corresponding portion of the casing whereby a bearing is formed for said sides.

10. A valve actuating rod comprising a member having a hollow cylindrical portion and a hollow stem of reduced diameter, a valve actuating rod telescopically engaging said stem, a cam bearing roll journaled within said hollow cylindrical portion, and a casing in which said member is slidably secured having portions respectively fitting the cylindrical portion and the hollow stem, said cylindrical portion and its corresponding part of the casing being so arranged that a bearing is formed for the sides of the cylindrical portion opposite the direction of rotation of said roll.

11. In an automobile engine, the combination of a valve stem and push rod, of an independent spacing disk between said parts, and a holder mounted on one of said parts and engaging the disk to prevent displacement thereof, said holder being provided with central openings to permit engagement of said valve stem or push rod with the disk.

In testimony whereof I affix my signature in presence of two witnesess.

GEORGE W. DUNHAM.

Witnesses:
CHAS. D. HASTINGS,
H. A. HILL.